US012562326B2

(12) United States Patent
Shen

(10) Patent No.: US 12,562,326 B2
(45) Date of Patent: Feb. 24, 2026

(54) LOW PROFILE COMPATIBLE WITH A STANDARD MECHANICAL PROFILE/MX PROFILE KEYBOARD

(71) Applicant: Dongguan Weizhong Electronics Co., Ltd, Dongguan (CN)

(72) Inventor: Qinyu Shen, Changsha (CN)

(73) Assignee: Dongguan Weizhong Electronics Co., Ltd, Dongguan (CN)

( * ) Notice: Subject to any disclaimer, the term of this patent is extended or adjusted under 35 U.S.C. 154(b) by 241 days.

(21) Appl. No.: 18/491,475

(22) Filed: Oct. 20, 2023

(65) Prior Publication Data

US 2025/0014847 A1 Jan. 9, 2025

(30) Foreign Application Priority Data

Jul. 4, 2023 (CN) ......................... 202321734871.7

(51) Int. Cl.
*H01H 13/70* (2006.01)

(52) U.S. Cl.
CPC ....... *H01H 13/70* (2013.01); *H01H 2217/024* (2013.01)

(58) Field of Classification Search
CPC ...................................................... H01H 13/70
See application file for complete search history.

(56) References Cited

U.S. PATENT DOCUMENTS 11,640,884 B2 * 5/2023 Lin .......................... H05F 3/02 200/310
2017/0309421 A1 * 10/2017 Yu ......................... H01H 13/70

FOREIGN PATENT DOCUMENTS

CN 204464109 U * 7/2015
CN 106656146 A 5/2017
CN 207269004 U * 4/2018
CN 109672436 A 4/2019
(Continued)

OTHER PUBLICATIONS

R/MechanicalKeyboards, 3D printed cherry mx flat low profile keycaps., 2018, https://www.reddit.com/r/MechanicalKeyboards/comments/ajb57n/3d_printed_cherry_mx_flat_low_profile_keycaps_dsa/.*

(Continued)

*Primary Examiner* — Christle I Marshall
(74) *Attorney, Agent, or Firm* — George D. Morgan

(57) ABSTRACT

The invention discloses low profile switches for standard mechanical profile switch/MX profile switch keyboards, the low profile switch installed on PCB of standard mechanical profile switch/MX profile switch keyboards, the bottom of low profile switches arranged with a positioning column, the outer diameter of positioning column being 3.85 mm±0.15, one side of positioning column arranged with a moving unit pin and a stationary unit pin, the distance between moving unit pin and positioning column in X direction being L1, the distance between the moving unit pin and the positioning column in Y direction being L2, the distance between the stationary unit pin and the positioning column in X direction being L3, and the distance between the stationary unit pin and the positioning column in Y direction being L4; low profile switches in the invention compatible with standard mechanical profile switch/MX profile switch keyboards, to promote low profile switches at lower costs.

8 Claims, 18 Drawing Sheets

(56) References Cited

FOREIGN PATENT DOCUMENTS

CN 109672437 A 4/2019

OTHER PUBLICATIONS

Gateron, Low-Profile vs Normal Profile Mechanical Switches: Things You Should Know!, Mar. 9, 2023, https://web.archive.org/web/20230309211904/https://www.gateron.co/blogs/news/low-profile-vs-normal-profile-mechanical-switches-things-you-should-know.*

Chosfox, Tecsee Medium Switch, Mar. 23, 2023, https://web.archive.org/web/20230323212122/https://chosfox.com/collections/tecsee-switches/products/tecsee-medium-switch.* naenote.net, Tecsee Medium Tactile Review | Semi-Low-Profile MX Axle. Just 2mm Lower Makes a Huge Difference. , https://www.naenote.net/entry/tecsee-medium-tactile-review.* kprepublic.com, Tecsee Medium Linear Tactile Switch, Mar. 20, 2023, https://web.archive.org/web/20230320042331/https://kprepublic.com/products/tecsee-medium-linear-tactile-switch-5pin-rgb-smd-63-5g-middle-switch-for-mechanical-keyboard-pom-selected-spring.*

Yusha Kobo Shop, Tecsee Medium Switch / Tactile, Mar. 25, 2023, https://web.archive.org/web/20230325083135/https://shop.yushakobo.jp/products/7046.*

ThereminGoat's Switch, Tecsee Middle Switch Review, Oct. 15, 2023, https://www.theremingoat.com/blog/tecsee-middle-tactile-switch-review.*

Cherry MX series specification, Jun. 2023, https://cdn.sparkfun.com/datasheets/Components/Switches/MX%20Series.pdf.*

Tecsee, Tecsee pudding medium tactile linear mechanical gaming keyboard switch, Sep. 21, 2023, https://web.archive.org/web/20230921222417/https://tecseekeys.com/tecsee-pudding-medium-tactile-linear-mechanical-gaming-keyboard-switch.html.*

* cited by examiner

--Prior Art--

--Prior Art--

--Prior Art--

--Prior Art--

LOW PROFILE COMPATIBLE WITH A STANDARD MECHANICAL PROFILE/MX PROFILE KEYBOARD

CROSS-REFERENCE TO RELATED APPLICATIONS

The application claims priority to Chinese patent application No. 2023217348717, filed on Jul. 4, 2023, the entire contents of which are incorporated herein by reference.

TECHNICAL FIELD

The present invention in the patent application relates to the field of mechanical keyboard switch technology, specifically a low profile compatible with a standard mechanical profile/MX profile keyboard.

BACKGROUND

The keys of mechanical keyboard have a separate switch to control on and off, which is also known as the "profile". The conventional profile units, which are the profile units with a conventional height (standard mechanical profile), generally have a height of around 18.5 mm. To distinguish them from low profile units, these conventional profile units are generally referred to as high profile units. Low profiles, also known as ultra-thin profile units, generally have a height of around 11.9 mm, and the total stroke is not the conventional 4 mm, but a shorter 3 mm, with a shorter triggering time.

Nowadays, low profiles produced by low profile manufacturers need to match their own customized standard mechanical profile/MX profile keyboard PCB boards. However, among the player community, the Cherry MX profile unit can be said to be the most popular structure for mechanical keyboard profile units, and different manufacturers have standard MX profile unit sizes, which are suitable for most PCB boards and positioning boards with a high compatibility. Therefore, MX profile keyboards can be compatible with high profile produced by different manufacturers. Due to the different low profile structures and specifications of low profile manufacturers, the standard mechanical profile/MX profile keyboard PCB board and positioning board of the MX profile keyboard are not compatible with the low profile in the existing market, that is, as there is no industry standard for low profile keyboards, the structure manufactured by each manufacturer is different, resulting in the low profile not being compatible with the standard mechanical profile/MX profile keyboard positioning board and the standard mechanical profile/MX profile keyboard PCB board, but only being able to adapt to their own customized PCB boards.

For game players, if they need to replace the profile of the standard mechanical profile/MX profile keyboard with a low profile, they also need to match their own manufacturer's PCB board, which is quite expensive and cannot promote the popularity of the low profile. Therefore, the applicant has developed a low profile compatible with the standard mechanical profile/MX profile keyboard.

SUMMARY

The invention in the present patent is designed to provide a low profile compatible with a standard mechanical profile/MX profile keyboard, which is compatible with a standard mechanical profile/MX profile keyboard, so as to solve the issue stated in the background section.

To achieve the above objective, the present invention in the patent application provides a low profile compatible with a standard mechanical profile/MX profile keyboard, wherein the said low profile is installed on the PCB board of the standard mechanical profile/MX profile keyboard, the bottom of the said low profile is arranged with a positioning column that is centered, the outer diameter of the said positioning column is set to 3.85 mm±0.15, one side of the said positioning column is separately arranged with a moving unit pin and a stationary unit pin, the distance between the said moving unit pin and the said positioning column in the X direction is L1, with L1 being 2.55 mm±0.15, the distance between the moving unit pin and the positioning column in the Y direction is L2, with L2 being 5.08 mm±0.15, the distance between the stationary unit pin and the positioning column in the X direction is L3, with L3 being 3.80 mm±0.15, and the distance between the stationary unit pin and the positioning column in the Y direction is L4, with L4 being 2.55 mm±0.15.

In this embodiment, the outer diameter of the said first limit column and the said second limit column is 1.50 mm±0.15.

In this embodiment, the said low profile is arranged with a first limit column and a second limit column on both sides of the positioning column. The said first limit column and the said second limit column are located on the same horizontal line as the positioning column, and the distance between the first limit column and the second limit column in the X direction is L5, with L5 being 10 mm±0.15.

In the present invention in the patent application, the outer wall of the first limit column and the second limit column are arranged with three curved convex edges at an equal angle.

In this embodiment, the said low profile comprises a profile cap, a profile rod, a spring, a conduction component, and a profile seat arranged sequentially from the top to the bottom, the said profile cap is sleeved on the profile rod and clamped and connected with the profile seat, the said spring is arranged between the profile rod and the profile seat, the said conduction component is movably in contact with the profile rod and is arranged between the profile cap and the profile seat, an installation groove for accommodating the conduction component is arranged on one side of the said profile seat, wherein the conduction component comprises a stationary unit and a moving unit installed in the installation groove, and the said moving unit is horizontally arranged in the installation groove.

In the present invention in the patent application, the said profile rod comprises a profile tube and a lever and a guide column respectively arranged above and below the profile tube, a guide block is arranged around the profile tube, and a tube position guide groove nested and connected with the guide block is arranged at the profile cap.

In the present invention in the patent application, the cross-sectional area of the said profile tube is square.

In the present invention in the patent application, a clamping groove is arranged on the said low profile for embedding the light guide component, and the light guide component can be disassembled and assembled in the clamping groove.

In the present invention in the patent application, the said PCB board is arranged with a number of switch installation positions, each switch installation position is arranged with a positioning hole, both sides of the positioning hole are provided with a first limit hole and a second limit hole, a first plug hole and a second plug hole are arranged on one side of the positioning hole respectively, the said moving unit pin is dynamically inserted into the first plug hole and then electrically contacts the PCB board, and the said stationary unit pin is dynamically inserted into the second plug hole and then electrically contacts the PCB board.

Compared with the prior art, the beneficial effect according to the present invention in the patent application is that: The low profile provided by the present invention in the patent application is compatible with standard mechanical profile/MX profile keyboards, allowing the low profile to be promoted and popularized at a lower cost.

100. PCB board of standard mechanical profile/MX profile keyboard; 110. First plug hole; 120. Second plug hole; 130. Positioning hole; 140. First limit hole; 150. Second limit hole; 160. Switch installation position;

200. Low profile; 210. Profile cap; 211. Profile hole; 212. Clamping slot; 213. Tube position guide groove; 214. Clamping groove; 220. Profile rod; 221. Profile tube; 222. Cross press lever; 223. Guide column; 224. Guide block; 225. Convex block; 230. Light guide component; 240. Profile seat; 241. Positioning column; 242. First limit column; 243. Second limit column; 244. Clamping block; 245. Installation groove; 250. Spring; 260. Moving unit; 261. Support unit; 2613. Moving unit pin; 2614. Moving unit curved segment; 262. Curved spring unit; 263. Contact spring unit; 2651. Contact point; 264. Counter pawl; 270. Stationary unit; 271. Stationary unit main body; 272. Stationary unit pin; 273. Stationary unit curved segment; 300. Mechanical profile/MX profile; 400. Positioning board.

DETAILED DESCRIPTION OF THE EMBODIMENTS

The technical solutions in the embodiment of the present invention in the patent application will be described clearly and in detail in combination with the FIGS. in the embodiment of the present invention in the patent application. Obviously, the described embodiment is only some of the embodiments of the present invention in the patent application, but not all of them. Based on the embodiment in the present invention in the patent application, all other embodiments obtained by those skilled in the art without creative labor fall within the scope of protection of the present invention in the patent application.

Refer to FIGS. 1-18. The present invention in the patent application provides a technical solution: A low profile 200, also known as a slim switch, wherein the said low profile 200 is installed on the PCB board 100 of the standard mechanical profile/MX profile keyboard, and the positioning board 400 is matched according to the pin position of the low profile 200.

Figure 1:
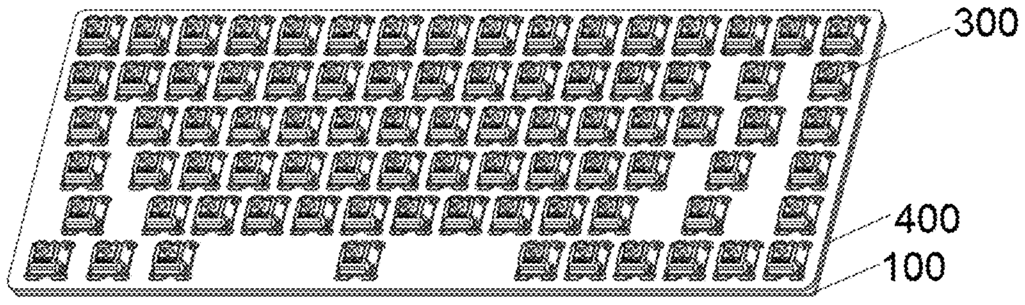
FIG. 1 shows the structure of a standard mechanical profile/MX profile keyboard in the prior art.
Figure 2:
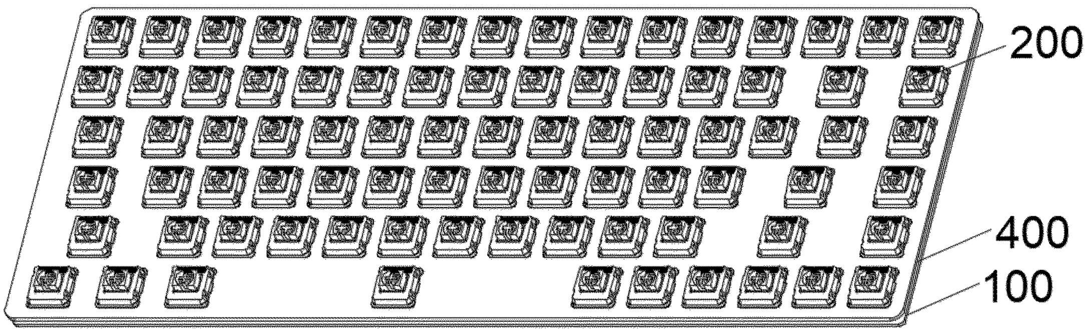
FIG. 2 shows a schematic diagram of the structure in the present invention in the patent application.
Figure 3:
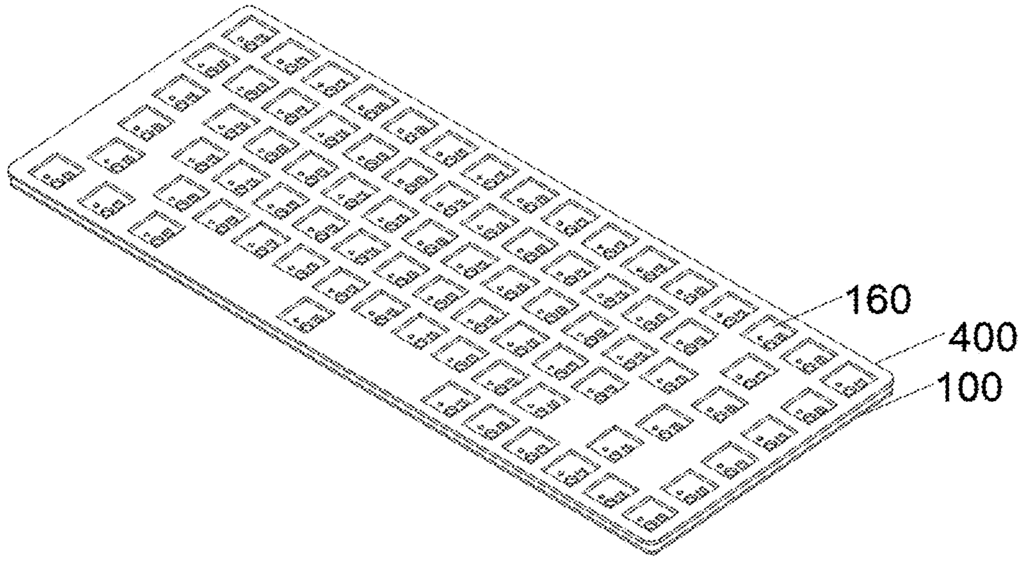
FIG. 3 shows a schematic diagram for the assembly of the positioning board and PCB board in the present invention in the patent application.
Figure 4:
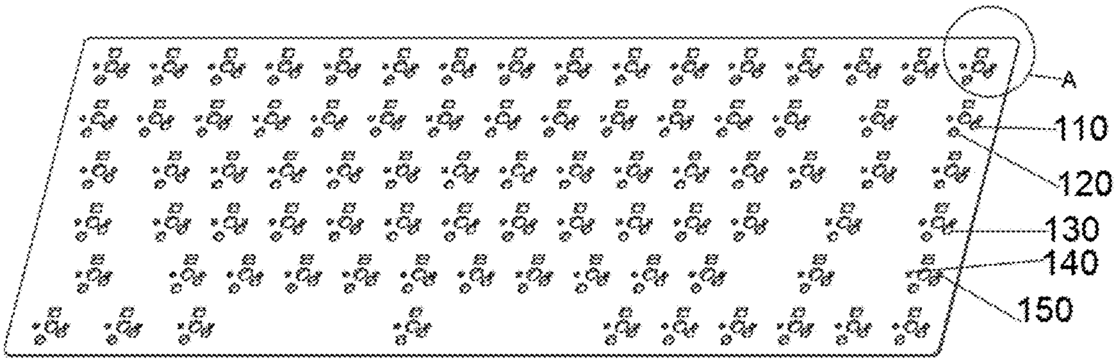
FIG. 4 shows a schematic diagram of the PCB board structure according to the present invention in the patent application.
Figure 5:
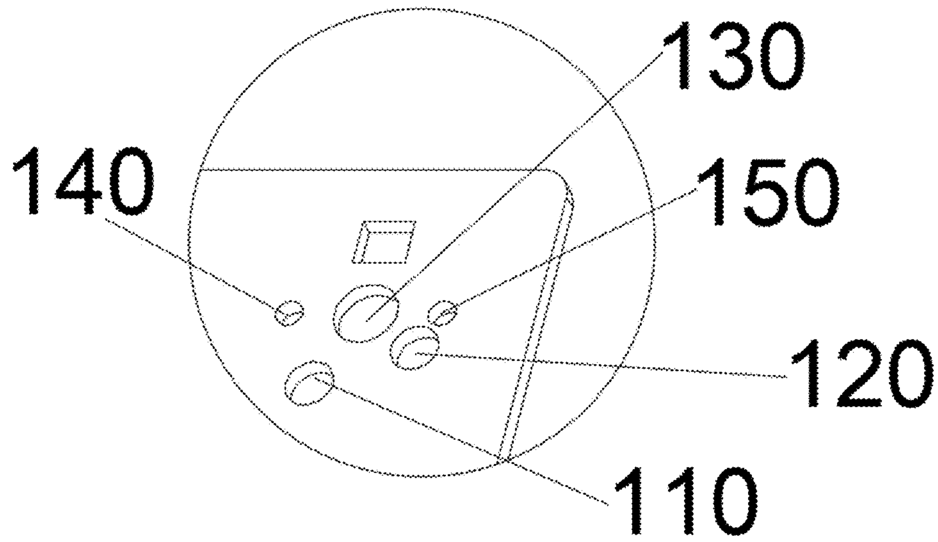
FIG. 5 shows a magnified view of section A in FIG. 4.
Figure 6:
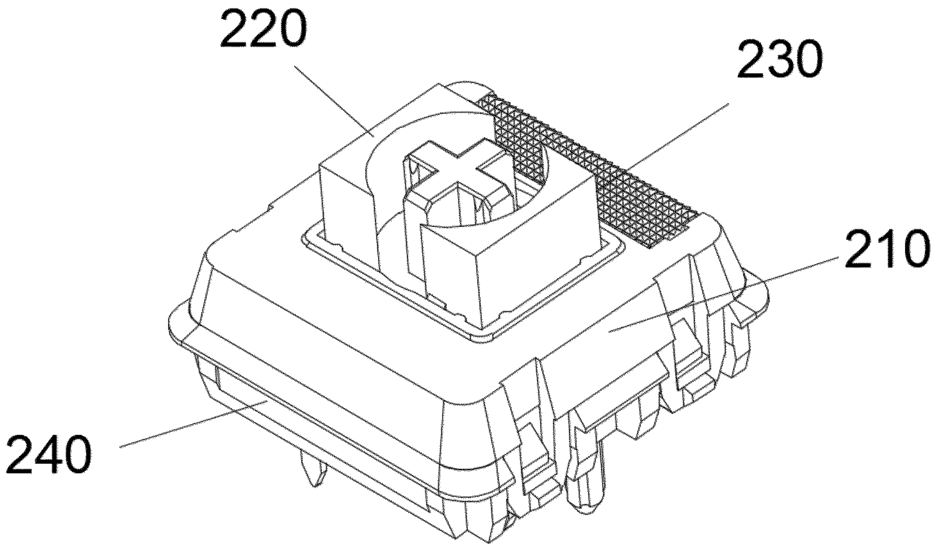
FIG. 6 shows a schematic diagram of the structure of the low profile according to the present invention in the patent application.
Figure 7:
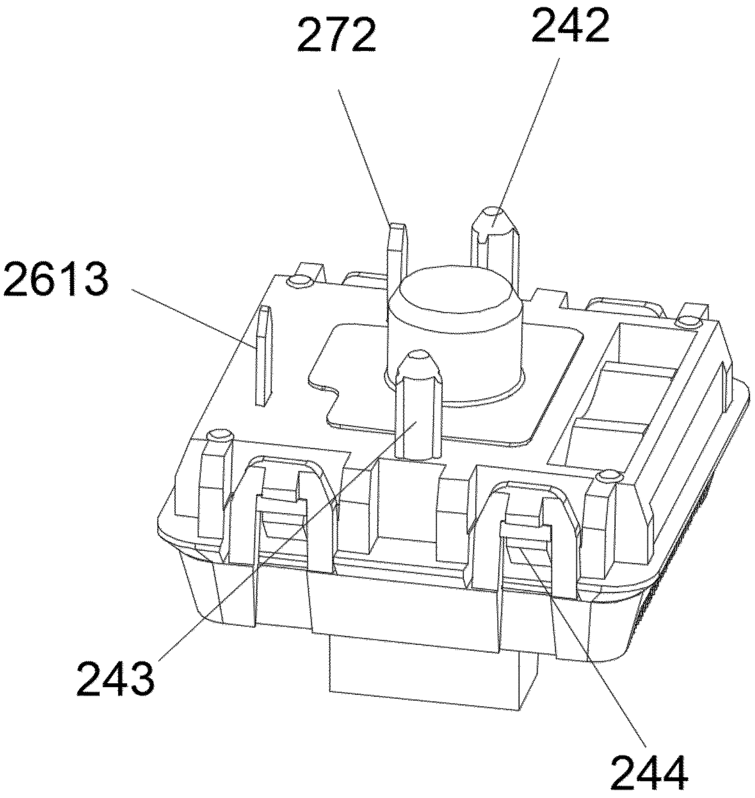
FIG. 7 shows a schematic diagram of the structure of the five-pinned low profile.
Figure 8:
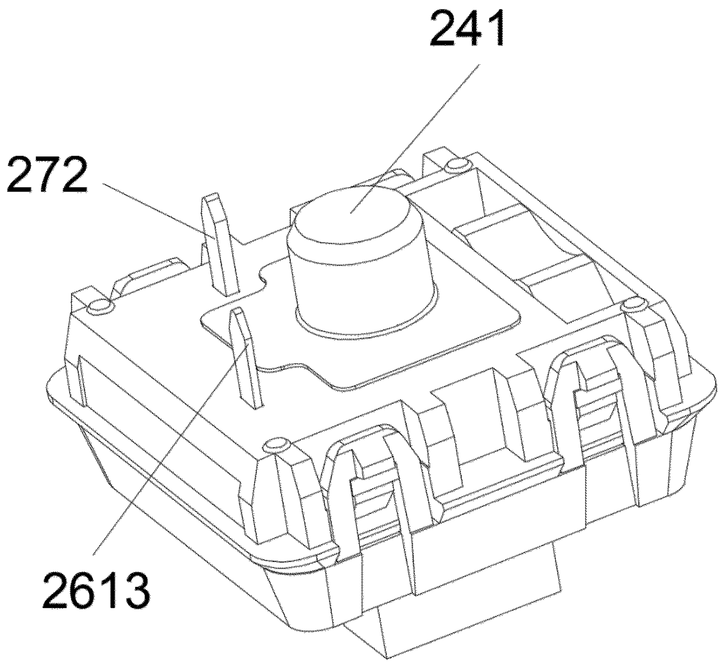
FIG. 8 shows a schematic diagram of the structure of the three-pinned low profile.

As shown in FIG. 1, the existing standard mechanical profile/MX profile keyboard has a mechanical profile/MX profile 300, while the manufacturers of the existing low profile 200 have developed their own structures, resulting in different specifications and sizes of low profile 200 of each manufacturer. If the standard mechanical profile/MX profile keyboard needs to be replaced with a low profile 200, the positioning board 400 and PCB board 100 of the original standard mechanical profile/MX profile keyboard also need to be replaced, resulting in high customization costs for the keyboard.

Figure 9:
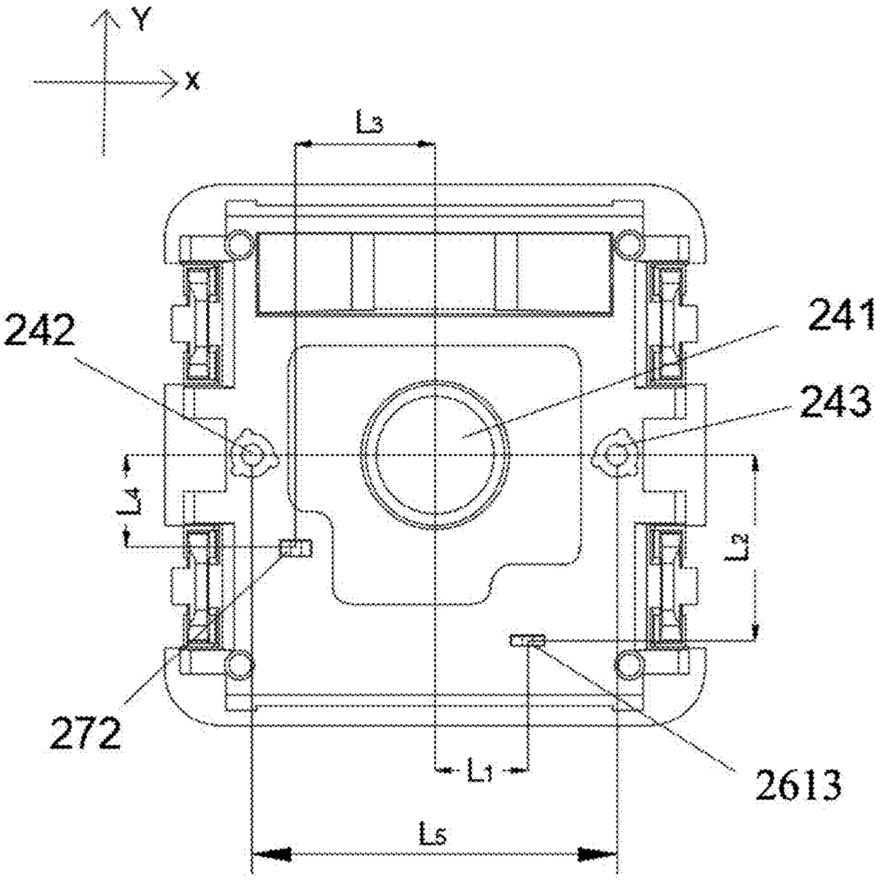
FIG. 9 shows a schematic diagram of the pin position structure of the low profile.
Figure 10:
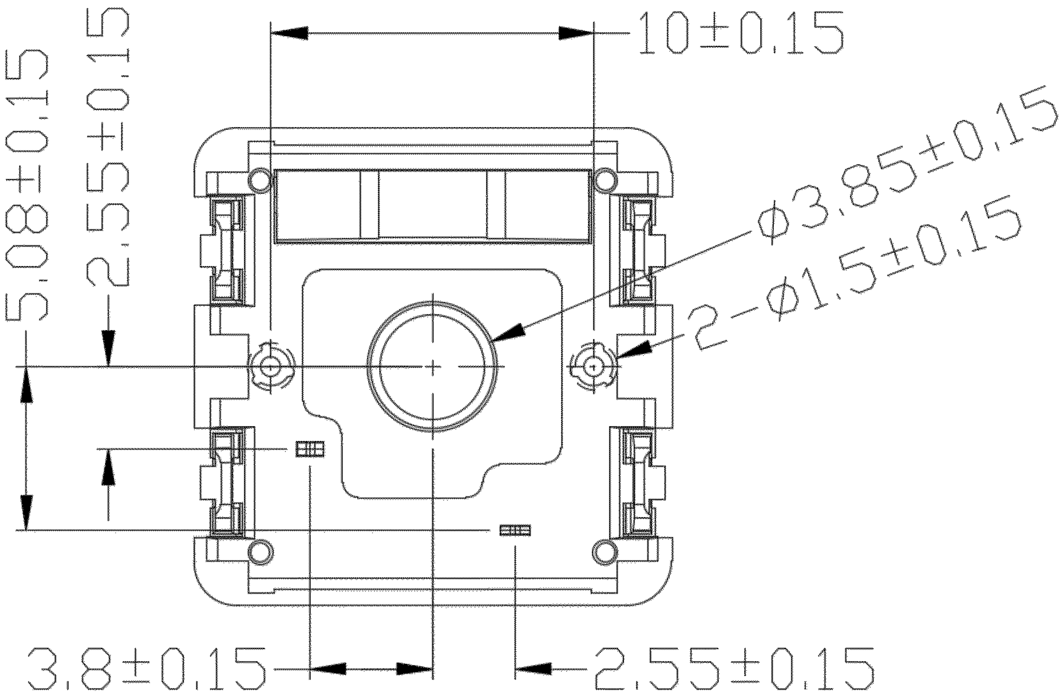
FIG. 10 shows a schematic diagram of the specific position relationship of the pins of the low profile.
Figure 11:
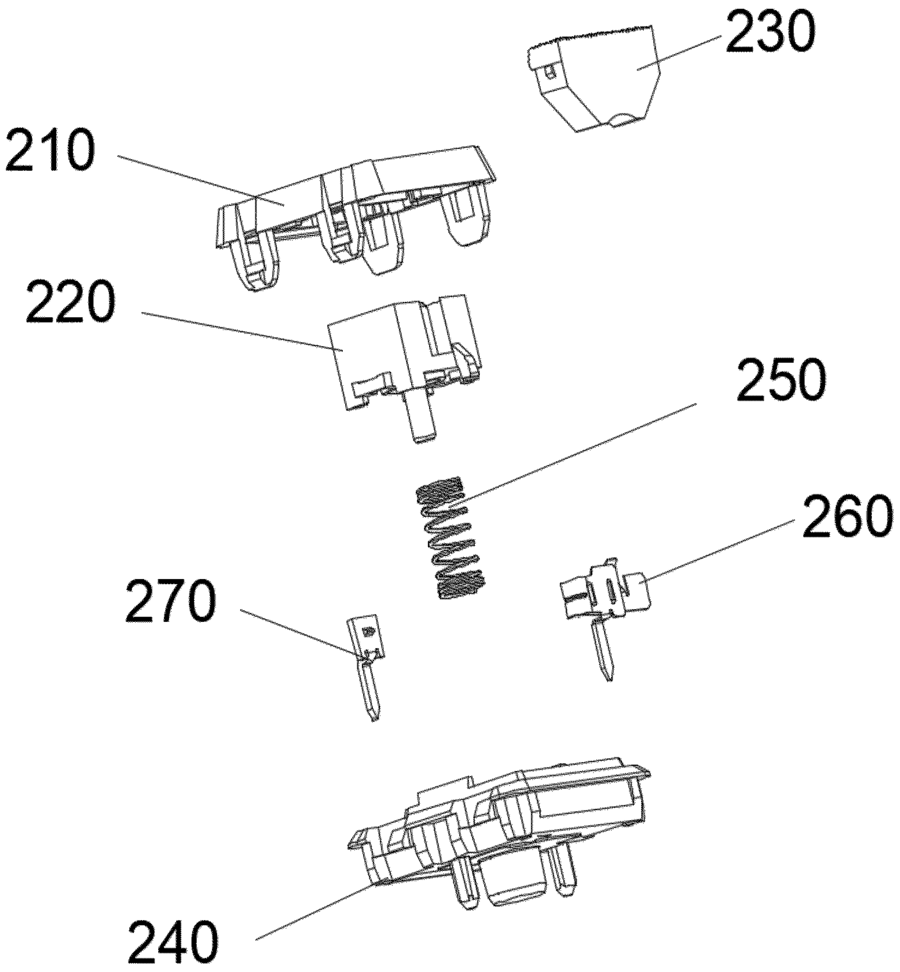
FIG. 11 shows an exploded view of the low profile according to the present invention in the patent application.
Figure 12:
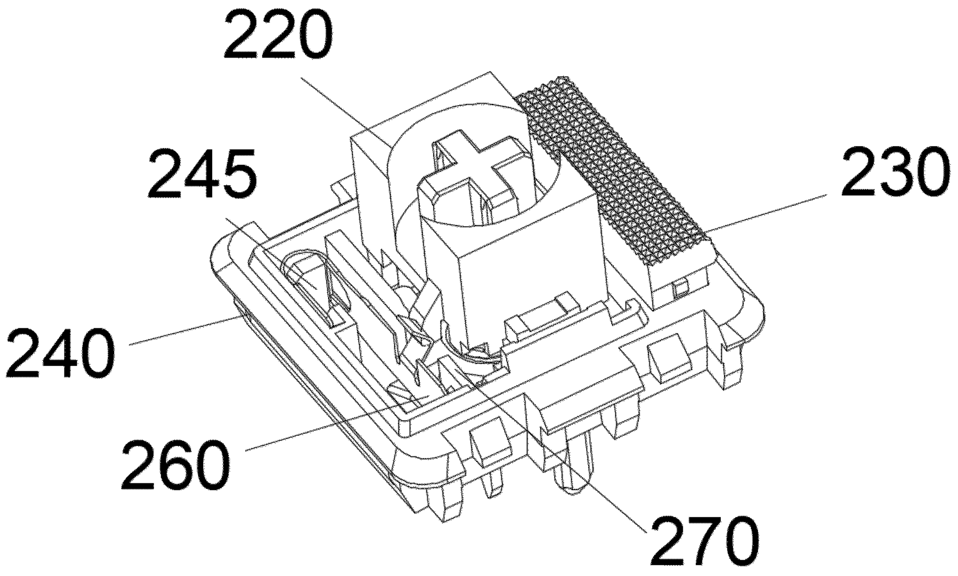
FIG. 12 shows a schematic diagram of the assembly of the moving unit, stationary unit, profile rod, and spring in the slim profile seat according to the present invention in the patent application.
Figure 13:
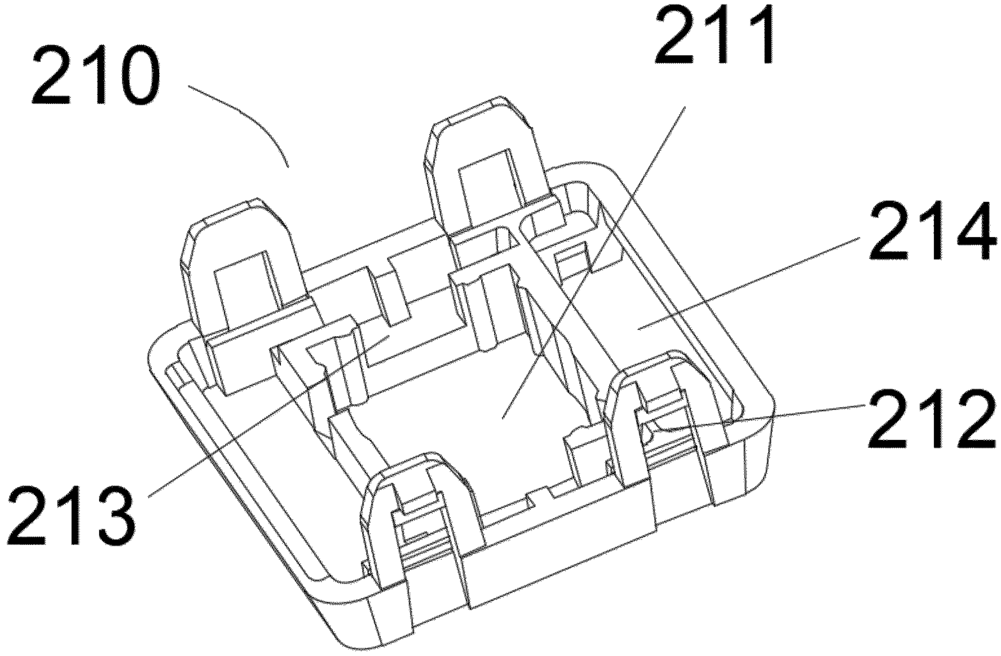
FIG. 13 shows a schematic diagram of the structure of the profile cap according to the present invention in the patent application.
Figure 14:
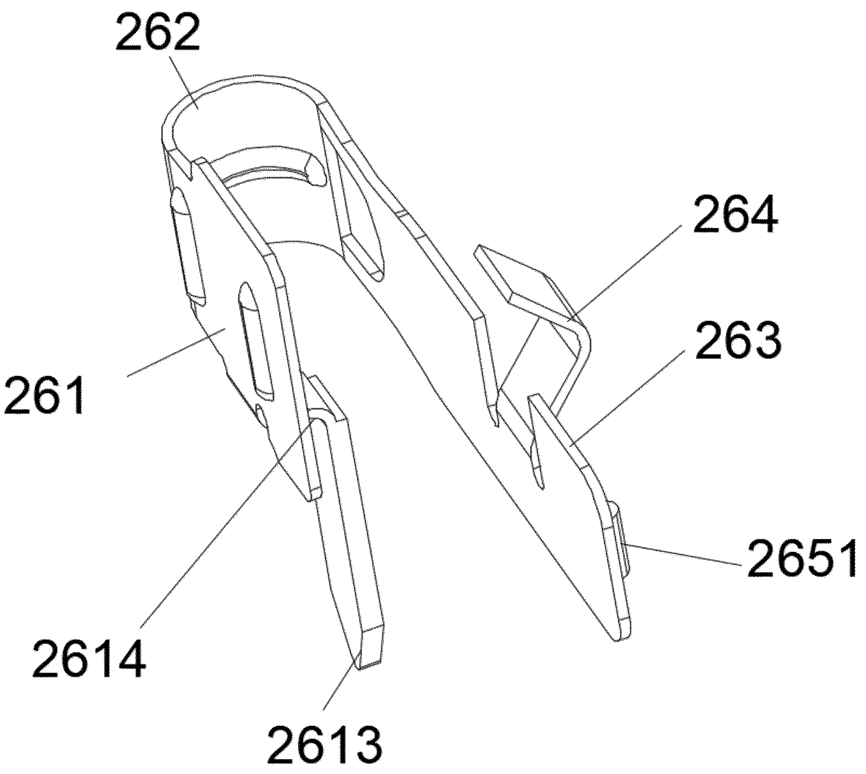
FIG. 14 shows a schematic diagram of the structure of the moving unit according to the present invention in the patent application.
Figure 15:
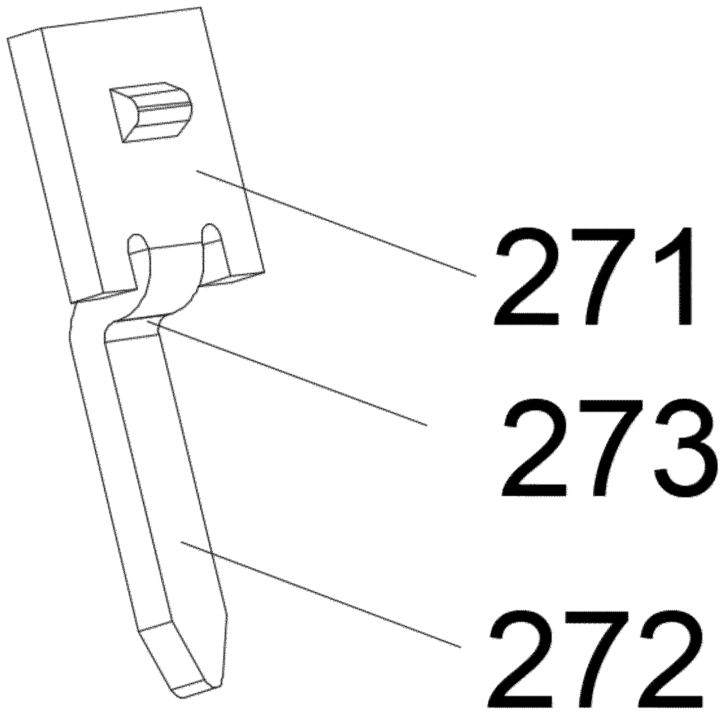
FIG. 15 shows a schematic diagram of the structure of the stationary unit according to the present invention in the patent application.
Figure 16:
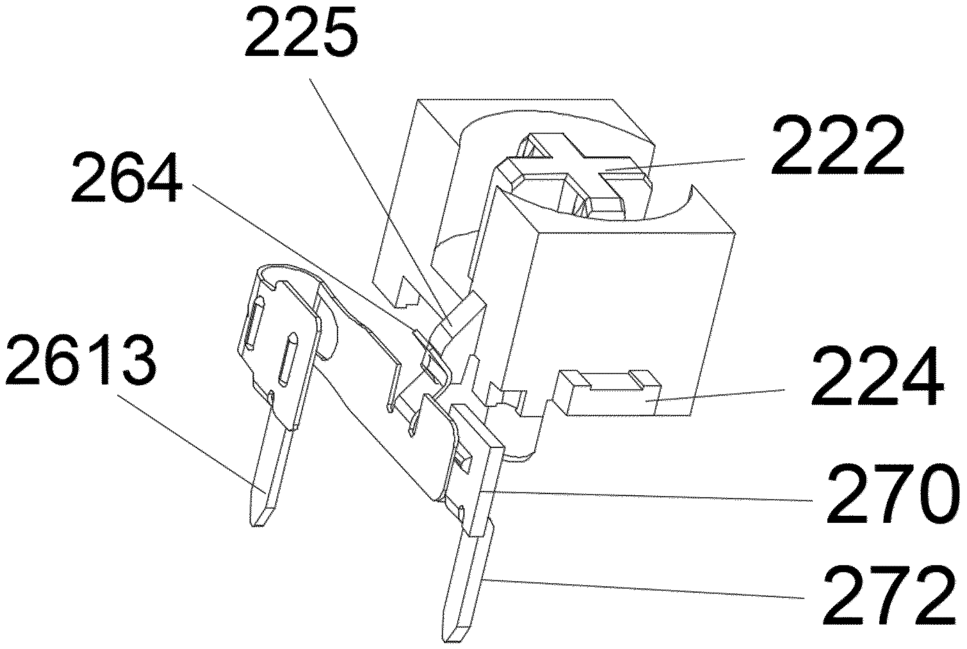
FIG. 16 shows a schematic diagram of the assembly of the profile rod, moving unit, and stationary unit according to the present invention in the patent application.
Figure 17:
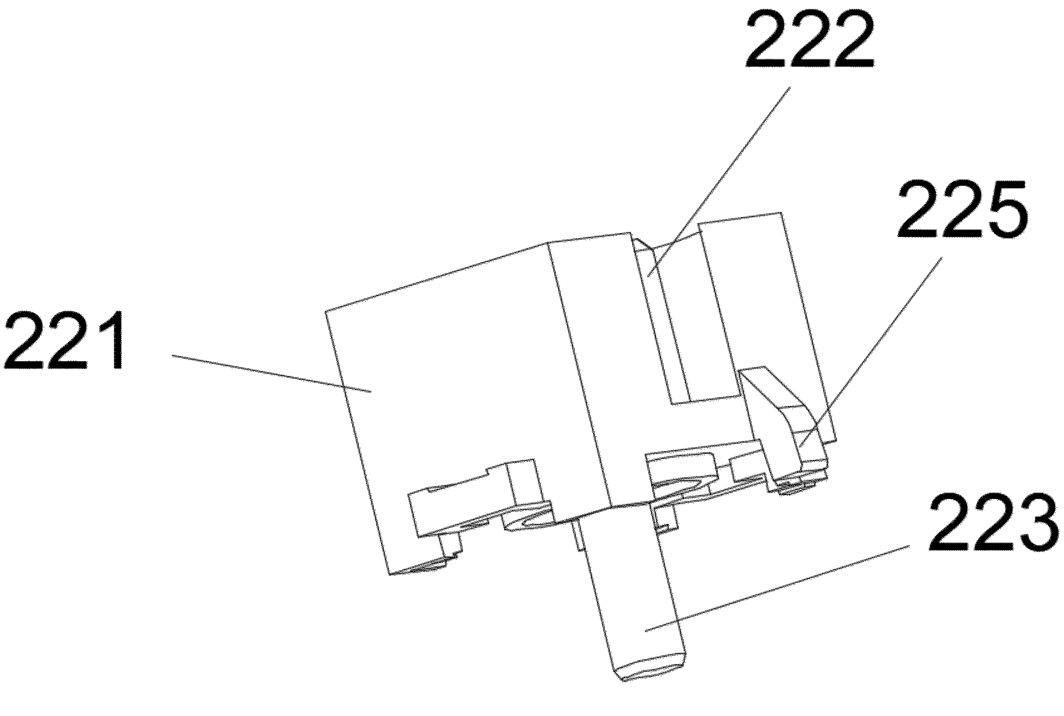
FIG. 17 shows a schematic diagram of the structure of the profile rod according to the present invention in the patent application.
Figure 18:
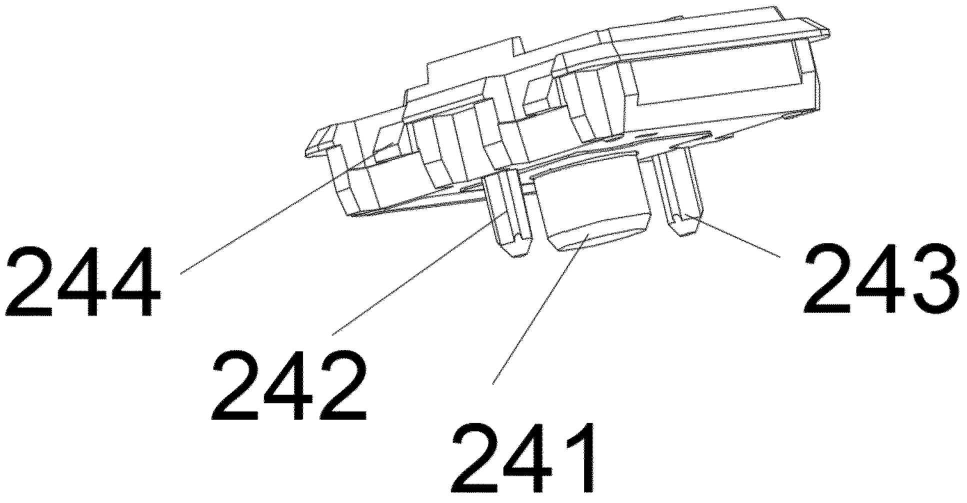
FIG. 18 shows a schematic diagram of the structure of the profile seat according to the present invention in the patent application. Legends in the FIGS.

As shown in FIG. 9, in the present invention in the patent application, the said low profile 200 is arranged with a centered positioning column 241, wherein the positioning column 241 facilitates installation and positioning with the PCB board 100 of the standard mechanical profile/MX profile keyboard. The outer diameter of the positioning column 241 is set to 3.85 mm±0.15, to be suitable for the positioning hole 130 on the PCB board 100 of the standard mechanical profile/MX profile keyboard. The distance between the said moving unit pin 2613 and the said positioning column 241 in the X direction is L1, with L1 being 2.55 mm±0.15, the distance between the moving unit pin 2613 and the positioning column 241 in the Y direction is L2, with L2 being 5.08 mm±0.15, the distance between the stationary unit pin 272 and the positioning column 241 in the X direction is L3, with L3 being 3.80 mm±0.15, and the distance between the stationary unit pin 272 and the positioning column 241 in the Y direction is L4, with L4 being 2.55 mm±0.15. This structure is called the three-pinned low profile 200. The profile seat 240 of the said low profile 200 is respectively arranged with a first limit column 242 and a second limit column 243 on both sides of the positioning column 241. The positioning column 241, the first limit column 242, and the second limit column 243 are integrated with the profile seat 240 by injection molding. The said first limit column 242 and the said second limit column 243 are located on the same horizontal line as the positioning column 241. The distance between the first limit column 242 and the second limit column 243 in the X direction is L5, with L5 being 10 mm±0.15. This structure is called the five-pinned low profile 200. Both the three-pinned low profile 200 and the five-pinned low profile 200 are suitable for the PCB board 100 of the standard mechanical profile/MX profile keyboard. A number of switch installation position 160 are arranged on the PCB board 100 of the standard mechanical profile/MX profile keyboard, and a positioning hole 130 is arranged in the middle of each switch installation position 160. A first limit hole 140 and a second limit hole 150 are arranged on both sides of the positioning hole 130. On the PCB board 100 of the standard mechanical profile/MIX profile keyboard, a first plug hole 110 is arranged for the insertion and removal of the moving unit pin 2613, and a second plug hole 120 is arranged for the insertion and removal of the stationary unit pin 272. In the present invention in the patent application, a five-pinned low profile 200 is taken as an example. When the five-pinned low profile 200 is installed on the PCB board 100 of the standard mechanical profile/MX profile keyboard, the positioning column 241 is placed in the positioning hole 130, the first limit column 242 and the second limit column 243 are respectively placed in the first limit hole 140 and the second limit hole 150, and the moving unit pin 2613 and the stationary unit pin 272 are respectively placed in the first plug hole 110 and the second plug hole 120.

The low profile 200 comprises a profile cap 210, a profile rod 220, a spring 250, a conduction component, and a profile seat 240 arranged sequentially from the top to the bottom, wherein the said profile cap 210 is arranged with a profile hole 211 that matches the profile rod 220, the profile rod 220 passes through the profile hole 211, the said profile cap 210 is sleeved on the profile rod 220 and then is clamped and connected to the profile seat 240, the profile seat 240 is arranged with a clamping block 244 for the profile cap 210 to be clamped and connected, the lower end of the profile cap 210 is arranged with a clamping slot 212 that matches the clamping block 244, so that the profile cap 210 and the profile seat 240 are detachable and the profile cap 210 can be disassembled and installed according to the actual needs in use. The profile cap 210 is clamped and connected with the profile seat 240 to form a housing chamber. The said spring 250 is arranged between the profile rod 220 and the profile seat 240 and is located in the housing chamber. The said conduction component is arranged in the housing chamber and is movably in contact with the profile rod 220. The profile rod 220 can move back and forth under external force, thus achieving the on or off state of the conduction component.

An installation groove 245 for accommodating the conduction component is arranged on one side in the said profile seat 240. The installation groove 245 is arranged with a conduction component, wherein the conduction component comprises a stationary unit 270 and a moving unit 260 installed in the installation groove 245, the said moving unit 260 spans across the installation groove 245, effectively utilizing the space of the profile seat 240 and effectively reducing the overall height of the low profile 200, making the low profile 200 ultra-thin, with a conduction stroke as high as 2 mm and a maximum stroke as high as 3 mm, thereby effectively reducing the overall height of the keyboard, making it slimmer.

The said moving unit 260 is an integrated structure made of metal material, comprising a support unit 261, a curved spring unit 262, and a contact spring unit 263 sequentially connected, wherein the support unit 261, the curved spring unit 262, and the contact spring unit 263 are sequentially connected in a "hooked" shape, and the support unit 261 is arranged with a moving unit pin 2613 connected to the circuit board, the contact spring unit 263 is arranged with a counter pawl 264. By applying pressure to the counter pawl 264, force can be transmitted to the contact spring unit 263, so that the contact spring unit 263 overcomes the spring force of the curved spring unit 262 (at this time the curved spring unit 262 undergoes elastic deformation) and moves towards the direction close to the support unit 261. A contact point 2651 is arranged on the opposite side of the contact spring unit 263 and the stationary unit 270.

In the present invention in the patent application, the contact point 2651 on the said moving unit 260 is connected to the stationary unit 270, and the counter pawl 264 arranged on the moving unit 260 is in contact with the profile rod 220. When the profile rod 220 is in the initial state, the profile rod 220 contacts the counter pawl 264 of the moving unit 260, and the profile rod 220 presses the moving unit 260, causing the contact plate of the moving unit 260 to be compressed. At this time, the stationary unit 270 is connected to the contact point 2651 of the moving unit 260, and the stationary unit 270 is in continuity with the moving unit 260. However, when the key cap is pressed, the profile rod 220 moves downwards with the key cap, then the profile rod 220 will move outward against the counter pawl 264 of the moving unit 260 (approaching the direction of the moving unit pin). At this time, the contact point 2651 of the moving unit 260 will separate from the stationary unit 270 until the contact point 2651 of the moving unit 260 is disconnected from the stationary unit 270. When the profile rod 220 (key cap) is released, the stationary unit 270 and the contact point 2651 of the moving unit 260 will be connected, and the stationary unit 270 and the moving unit 260 will be in continuity, thus realizing the on and off function. The said moving unit 260 is located on one side of the installation groove 245, and the said stationary unit 270 is arranged on the other side of the installation groove 245 opposite to the moving unit 260. As the moving unit 260 is horizontally placed in the profile seat 240, the moving unit 260 in the present invention in the patent application is changed from the conventional vertical placement to the horizontal placement, for which the height of the keyboard switch can not only effectively reduced to make the keyboard switch slimmer; but also the length of the moving unit 260 can be set according to the size of the profile seat 240, effectively increasing the length of the moving unit 260, that is, the length of arm of force of the moving unit 260 is long, and the force is good during use, which effectively improves the service life.

A moving unit curved segment 2614 is formed on the moving unit 260, which is electrically connected to the PCB board 100 of the standard mechanical profile/MX profile keyboard. The said moving unit curved segment 2614 is formed on the upper end of the moving unit pin 2613 and is connected to the support unit 261. The moving unit pin 2613 is movably inserted into the first plug hole 110, and the moving unit curved segment 2614 is precisely stuck above the first plug hole 110, but will not fall into the first plug hole 110, and the moving unit curved segment 2614, which is curved towards the contact spring unit, directly contacts the PCB board 100 of the standard mechanical profile/MX profile keyboard electrically, thereby achieving the electrical connection between the moving unit 260 and the PCB board 100 of the standard mechanical profile/MX profile keyboard.

The said stationary unit 270 comprises a stationary unit main body 271 and a stationary unit pin 272 connected to the stationary unit main body 271. A stationary unit curved segment 273 is formed on the stationary unit 270, which is electrically connected to the PCB board 100 of the standard mechanical profile/MX profile keyboard. The said stationary unit curved segment 273 is formed on the upper end of the stationary unit pin 272 and connected to the stationary unit main body 271. The lower end of the stationary unit pin 272 is movably inserted into the second plug hole 120, and the stationary unit curved segment 273 is precisely stuck above the second plug hole 120, but will not fall into the second plug hole 120, and the stationary unit curved segment 273 that is curved on the outside directly contacts the PCB board 100 of the standard mechanical profile/MX profile keyboard electrically, thus achieving the electrical connection between the stationary unit 270 and the PCB board 100 of the standard mechanical profile/MX profile keyboard.

The said profile rod 220 comprises a profile tube 221 as well as a cross press lever 222 and a cylindrical guide column 223 arranged above and below the profile tube 221 respectively. The guide column 223 is sleeved with a spring 250, which is conducive to realizing that after the key cap is pressed, the profile rod 220 can be returned via the spring 250. The cross press lever 222 passes through the profile cap 210 and slides and fits in conjunction with the profile cap 210. A guide block 224 is arranged around the profile tube 221, and a tube position guide groove 213 nested and connected with the guide block 224 is arranged at the profile cap 210; In the other embodiments, the tube position guide groove 213 can also be arranged on the profile seat 240; The guide block 224 moves back and forth in the tube position guide groove 213, which is beneficial for limiting the back and forth movement of the profile rod 220, and making the back and forth movement of the profile rod 220 stabler. The said cross press lever 222 is arranged with a key cap, and the said key cap is directly connected fit with the profile 220. The top of the profile rod 220 is directly connected fit with the key cap, and the profile rod 220 with a square profile tube 221 effectively increases the contact support area between the profile rod 220 and the key cap, improving the balance of the key cap.

The periphery of the said profile rod 220 is arranged with a convex block 225 that is matched with the moving unit 260. Furthermore, the upward and downward movement of the convex block 225 is conducive to achieving the on or off state of the contact point between the stationary unit 270 and the moving unit 260.

When the low profile 200 is installed on the PCB board 100 of the standard mechanical profile/MX profile keyboard, it is the low profile 200 that performs insertion and removal operations on the PCB board 100 of the standard mechanical profile/MX profile keyboard. When the low profile 200 is inserted into the PCB board 100 of the standard mechanical profile/MX profile keyboard, the moving unit pin 2613 of the moving unit 260 is inserted into the first plug hole 110; The stationary unit pin 272 of the stationary unit 270 is inserted into the second plug hole 120, and the positioning column 241 is inserted into the positioning hole 130, achieving the positioning of the low profile 200 on the PCB board 100 of the standard mechanical profile/MX profile keyboard. When the low profile 200 is removed from the PCB board 100 of the standard mechanical profile/MX profile keyboard, the positioning column 241 is removed from the positioning hole 130, and the low profile 200 is separated from the PCB board 100 of the standard mechanical profile/MX profile keyboard.

In the present invention in the patent application, the outer wall of the first limit column 242 and the second limit column 243 is arranged with three curved convex edges at an equal angle. When assembling the PCB board 100 of the standard mechanical profile/MX profile keyboard via the first limit column 242 and the second limit column 243, deformation of the moving unit pin 2613 and the stationary unit pin 272 during assembly is prevented.

In the present invention in the patent application, the upper surface of the profile cap 210 is arranged with a clamping groove 214 for embedding the light guide component 230. The light guide component 230 can be disassembled and assembled in the clamping groove, and the light guide component 230 has a light guide function. The light guide component 230 is used to improve the light guide effect of the switch, and the light guide component 230 in different colors can be replaced according to the different body of the keyboard switch profile 220, so as to better distinguish keys and improve the effect of use of the keyboard.

The standard parts used in the present application document are available from the market, and for the specific connection methods of each part, mature conventional methods such as clamp and terminals in the prior art are adopted, and no specific description will be given here.

Although embodiments of the present invention in the patent application have been shown and described, it can be understood for the ordinary technical personnel in the art that various changes, modifications, substitutions, and variations can be made to these embodiments without departing from the principles and spirit of the present invention in the patent application, and the scope of the present invention in the patent application is defined by the accompanying claims and their equivalents.

What is claimed is:

1. A low profile compatible with a standard mechanical profile/MX profile keyboard, wherein the said low profile is installed on the PCB board of the standard mechanical profile/MX profile keyboard, the bottom of the said low profile is arranged with a positioning column that is centered, the outer diameter of the said positioning column is set to 3.85 mm±0.15, one side of the said positioning column is separately arranged with a moving unit pin and a stationary unit pin, the distance between the said moving unit pin and the said positioning column in the X direction is L1, with L1 being 2.55 mm±0.15, the distance between the moving unit pin and the positioning column in the Y direction is L2, with L2 being 5.08 mm±0.15, the distance between the stationary unit pin and the positioning column in the X direction is L3, with L3 being 3.80 mm±0.15, and the distance between the stationary unit pin and the positioning column in the Y direction is L4, with L4 being 2.55 mm±0.15, wherein the said low profile comprises a profile cap, a profile rod, a spring, a conduction component, and a profile seat arranged sequentially from the top to the bottom, the said profile cap is sleeved on the profile rod and clamped and connected with the profile seat, the said spring is arranged between the profile rod and the profile seat, the said conduction component is movably in contact with the profile rod and is arranged between the profile cap and the profile seat, an installation groove for accommodating the conduction component is arranged on one side of the said profile seat, wherein the conduction component comprises a stationary unit and a moving unit installed in the installation groove, and the said moving unit is horizontally arranged in the installation groove, wherein said moving unit comprises a support unit, a curved spring unit, and a contact spring unit sequentially connected in a hooked shape, and the extension direction from said support unit sequentially to said curved spring unit and to said contact spring unit is lateral to the extension direction of said profile rod.

2. A low profile compatible with a standard mechanical profile/MX profile keyboard according to claim 1, wherein the said low profile is respectively arranged with a first limit column and a second limit column on both sides of the positioning column, the said first limit column and the said second limit column are located on the same horizontal line as the positioning column, and the distance between the first limit column and the second limit column in the X direction is L5, with L5 being 10 mm±0.15.

3. A low profile compatible with a standard mechanical profile/MX profile keyboard according to claim 2, wherein the outer diameter of the said first limit column and the said second limit column is 1.50 mm±0.15.

4. A low profile compatible with a standard mechanical profile/MX profile keyboard according to claim 2, wherein the outer wall of the said first limit column and the said second limit column is set with three curved convex edges at an equal angle.

5. A low profile compatible with a standard mechanical profile/MX profile keyboard according to claim 1, wherein the said profile rod comprises a profile tube and a lever and a guide column respectively arranged above and below the profile tube, a guide block is arranged around the profile tube, and a tube position guide groove nested and connected with the guide block is arranged at the profile cap.

6. A low profile compatible with a standard mechanical profile/MX profile keyboard according to claim 5, wherein the cross-sectional area of the said profile tube is square.

7. A low profile compatible with a standard mechanical profile/MX profile keyboard according to claim 1, wherein a clamping groove is arranged on the said low profile for embedding the light guide component, and the light guide component can be disassembled and assembled in the clamping groove.

8. A low profile compatible with a standard mechanical profile/MX profile keyboard according to claim 1, wherein the said PCB board is arranged with a number of switch installation positions, each switch installation position is arranged with a positioning hole, both sides of the positioning hole are provided with a first limit hole and a second limit hole, a first plug hole and a second plug hole are arranged on one side of the positioning hole respectively, the said moving unit pin is dynamically inserted into the first plug hole and then electrically contacts the PCB board, and the said stationary unit pin is dynamically inserted into the second plug hole and then electrically contacts the PCB board.

* * * * *